United States Patent [19]
Chang et al.

[11] Patent Number: 5,999,651
[45] Date of Patent: Dec. 7, 1999

[54] APPARATUS AND METHOD FOR TRACKING DEFORMABLE OBJECTS

[75] Inventors: Yuh-Lin Chang, Monmouth Jct.; Yun-Ting Lin, Princeton, both of N.J.

[73] Assignee: Matsushita Electric Industrial Co., Ltd., Osaka, Japan

[21] Appl. No.: 08/871,730

[22] Filed: Jun. 6, 1997

[51] Int. Cl.⁶ .................................................. G06K 9/62
[52] U.S. Cl. ......................................... 382/215; 382/199
[58] Field of Search ........................... 348/699, 19, 416; 382/199, 103, 107, 236, 238, 239, 215

[56] References Cited

U.S. PATENT DOCUMENTS

| 5,598,215 | 1/1997 | Watanabe | 348/416 |
| 5,751,362 | 5/1998 | Lee | 348/416 |
| 5,768,413 | 6/1998 | Levin et al. | 382/173 |

OTHER PUBLICATIONS

Chiou et al., A Neural Network–based Stochastic Active Contour Model (NNS–SNAKE) for Contour Finding of Distinct Features, IEEE Transactions on Image Processing, vol. 4, No. 10, Oct. 1995.

Amini, A. A. et al., "Using Dynamic Programming for Minimizing the Energy of active Contours in the Presence of hard Constraints"' Proceedings 2nd Intern'l Conf. on Comp. Vision, 1988.

Ngo et al., "Motion Tracking and Analysis of Deformable Objects by Generalized Active Contour Models", ACCV'95 2nd Asian Conf. on Comp. Vision, Dec. 1995.

S.T. Barnard and W.B. Thompson. Disparity analysis of images. *IEEE Trans. On Pattern Analysis and Machine Intelligence*, 1(4), Jul. 1980, pp. 333–340.

A.K. Jain, Y. Zhong, and S. Lakshmann. Object matching using deformable templates. *IEEE Trans. On Pattern Analysis and Machine Intelligence*, 18(3), Mar. 1996, pp. 267–278.

M. Kass, A. Witkin, and D. Terzopoulos. Snakes: active contour models. *International Journal of Computer Vision*, pp. 321–331, 1988.

D. Teropoulos and R. Szeliski. Tracking with Kalman snakes. A. Blake and A. Yuille, editors, *Active Vision*. MIT Press, Cambridge, Massachusetts, 1992, pp. 3–20.

Y. Wang and O. Lee. Active mesh—a feature seeking and tracking image sequence representation scheme. *IEEE Trans. on Image Processing*, 3(5), Sep. 1994, pp. 610–624.

D. Williams and M. Shah. A fast algorithm for active contour. In *The 3rd IEEE International Conference on Computer Vision*, pp. 592–595, Dec. 1990.

C.W. Ngo, S. Chan, and K.F. Lai. Motion Tracking and Analysis of Deformable Objects by Generalized Active Contour model. In *Second Asian Conference on Computer Vision*, pp. 442–446, 1995.

A.P. Paplinski and J.F. Boyce. An Implementation of the Active Contour Method for Noisy Images Using a Local Minimisation Algorithm. Technical Report TR–95–1, Department of Robotics and Digital Technology, Monash University, Clayton, Australia, pp. 1–7, Jan. 1995.

*Primary Examiner*—Amelia Au
*Assistant Examiner*—Martin E Miller
*Attorney, Agent, or Firm*—Harness, Dickey & Pierce, P.L.C.

[57] ABSTRACT

A computer-implemented method and apparatus for tracking an image object within successive first and second image frames. The first frame has a first contour model which defines the image object within the first frame. The first contour model has a global motion parameter which defines global motion of the image object between the first frame and at least one frame preceding the first frame. A second contour model is defined in the second frame based upon the global motion parameter. Image blocks that are associated with points on the first contour model are matched with image blocks associated with points on the second frame to produce motion probabilities associated with each contour point. The motion probabilities are based upon the amount of displacement between respective matched image blocks of the first and second contour models. The shape of the second contour model is locally adjusted based upon the motion probabilities to produce a locally adjusted second contour model.

60 Claims, 7 Drawing Sheets

APPARATUS AND METHOD FOR TRACKING DEFORMABLE OBJECTS

BACKGROUND OF THE INVENTION

1.0 Technical Field

The present invention relates generally to computerized video image tracking and more particularly to tracking deformable objects with a computerized active contour model.

2.0 Discussion

Tracking and extraction of deformable objects from a video sequence have significant uses for multimedia systems and image analysis. Its applications include content-based video indexing, image and video manipulation, and model-based video compression. Two principle reasons exist for why object deformation needs to be taken into consideration in those applications. First, most natural objects of interest are non-rigid. Some of them are articulated (e.g., humans, animals, trees, etc.) and others are deformable or elastic. Secondly, rigid objects can also appear to be "deformed" in two-dimensional images, due to the perspective projection and lens distortion effects.

The tracking of deformable objects encounters several problems. A deformable object's structure can change over time and no single motion description can accurately describe the local motion for each subpart of the object. On the other hand, occlusion can cause even more problems during the tracking. The disappearance or re-appearance of a certain part of the object can change the neighborhood characteristic of the contour points which define the contour of an object. This situation usually results in misleading the tracking of the object.

Different models have been suggested to represent deformable objects. Meshes can be used to model object deformation by estimating the motion of each nodal point constrained by a mesh structure. Deformable templates have also been used to find similar objects after some kind of deformation in a video frame (see: A. K. Jain, Y. Zhong, and S. Lakshmanan, Object Matching Using Deformable Templates, IEEE Trans. on Pattern Analysis and Machine Intelligence, March 1996).

Also, the snake approach has been used in extracting objects from still images. A snake is an elastic curve placed on an image object that converges toward image object features that satisfy certain smoothness constraints. To extend it to tracking image objects in image sequences, a reliable motion estimation algorithm is needed and is lacking in past works.

Several researchers have studied snakes combined with motion prediction and estimation for deformable objects contours. Terzopoulos and Szeliski proposed the Kalman snake, which incorporates the dynamic snake into the Kalman filter system for tracking rigid or non-rigid objects (see: D. Terzopoulos and R. Szeliski, Tracking With Kalman Snakes, A. Blake and A. Yuille, editors, Active Vision. MIT Press, Cambridge, Mass., 1992). Ngo et al. proposed the generalized active contour model (called g-snake) for tracking the object boundaries (see: C. W. Ngo, S. Chan and K. F. Lai, Motion Tracking And Analysis Of Deformable Objects By Generalized Active Contour Model, Second Asian Conference on Computer Vision, pages 442–446, 1995). Temporal motion information is used for adaptive global motion prediction of the target object. However, only global motion prediction is used and the lack of local motion estimation can still lead to tracking failure, especially when the image contains complicated edge structures or when the object has significant local deformation.

SUMMARY OF THE INVENTION

The present invention is a computer-implemented method of tracking an image object within successive first and second image frames. The first frame has a first contour model which defines the image object within the frame. The first contour model has a global motion parameter which defines the global motion of the image object between the first frame and at least one frame preceding the first frame.

First, the present invention defines a second contour model in the second frame based upon the global motion parameter. Next, image blocks which are associated with points on the first contour model with image blocks associated with points on the second frame are matched in order to produce motion probabilities associated with each contour point. The motion probabilities are based upon the amount of displacement between the respective matched image blocks of the first and second contour models.

The shape of the second contour model is then locally adjusted based upon the motion probabilities to produce a locally adjusted second contour model. The locally adjusted second contour model is refined by converging the second contour model towards the image object within the second image frame based upon predefined smoothness constraints and upon the motion probability data.

BRIEF DESCRIPTION OF THE DRAWINGS

Additional advantages and features of the present invention will become apparent from the subsequent description and the appended claims, taken in conjunction with the accompanying drawings, in which:

DETAILED DESCRIPTION OF THE PREFERRED EMBODIMENT

Figure 1:
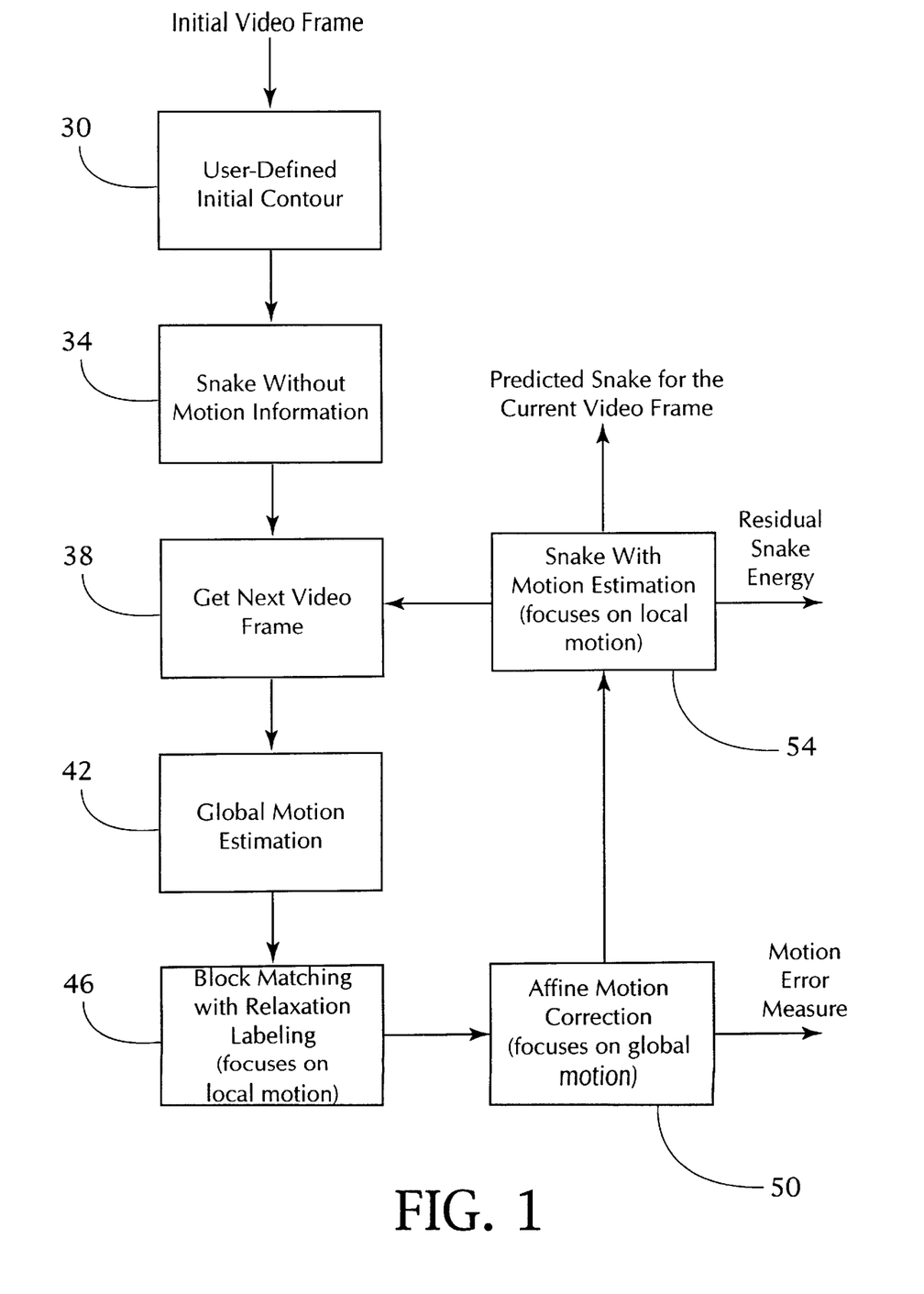
FIG. 1 is a flow chart showing the steps for tracking an object image within a video frame.

An overview of the functions of the present invention is presented in FIG. 1. At block 30, the user defines an initial object contour to start the tracking process. For the preferred embodiment, the initial contour should be close to the object boundary to ensure good tracking, especially when the background and/or the object contain a lot of edges.

After the initial input, a simple snake algorithm without motion estimation is applied at block 34 to move the initial contour for smoothness and to lock on desired features (edges). Block 38 obtains the next video frame.

Block 42 examines previous frames to determine the general motion of the object and to establish a rough estimate of the new positions of the snake points of the object within the newly acquired video frame. Based upon this rough estimate, the local motion of each snake point is determined at block 46 for each snake point. Block 46 uses a technique which focuses on the motion local to each snake point to determine the likelihood that a snake point has moved to a location within the next frame. For the preferred embodiment, the technique of block 46 uses a block matching algorithm with relaxation labeling.

The motion-compensated contour is used as the initial estimate for the snake energy minimization process for the new frame. This motion estimation and snake energy minimization processes are performed sequentially for each video frame.

The present invention automatically generates two different degradation measures for monitoring the contour tracking performance. Block 50 performs an affine transformation in order to represent the object's motion and calculates the affine warped matching error. Block 54 generates the second one which is based on the total snake energy for each estimated contour. Such error measures are useful for interactive object tracking systems, which require the system to have some intelligence in terms of self-monitoring for any significant performance degradation. In the preferred embodiment, the system alarms the user and asks for user input to restart the tracking once the degradation has exceeded a predetermined threshold. These steps are now discussed in greater detail.

Snake Calculation Without Motion Information

Each snake (contour) is represented by an ordered set of points, $V=[v_1, v_2, \ldots, v_n]$ where $v_i=(x_i,y_i)$. Once an initial contour is defined, the contour is modified iteratively through an energy minimization process. For each snake point, the energy $E_i$ is a weighted sum of three terms representing continuity, curvature, and image forces, respectively:

$$E_{snake} = \sum_i E_i$$
$$= \sum_i (\alpha E_{cont}(v_i) + \beta E_{curv}(v_i) + \gamma E_{img}(v_i))$$

During the iteration process, a neighborhood of each snake point is examined. The point in the neighborhood which gives the smallest energy is chosen as the new location for that point.

The first continuity term is designed to encourage the distance between adjacent snake points to be equal:

$$E_{cont}(v_i)=|\bar{d}-d(v_i,v_{i-1})|$$

where $d(v_i,v_{i-1})$ denotes the average distance between $v_i$ and $v_{i-1}$, and $\bar{d}$ is the average distance for all such pairs.

For contour smoothness, the curvature is used and is estimated at each snake point as:

$$E_{curv}(v_i)=|v_{i-1}-2v_i+v_{i+1}|$$

Both $E_{cont}$ and $E_{curv}$ are normalized to [0,1].

Finally, the image force is defined by the gradient magnitude of edge pixels. The gradient magnitude, g, in the neighborhood of a snake point is first calculated and normalized. The gradient maximum $g_{max}$ and minimum $g_{min}$ are determined. For each point, the energy from image force is defined as $$E_{img}(v_i) = -\frac{g - g_{min}}{g_{max} - g_{min}}$$

The minus sign at the right hand side of the equation indicates that the energy is low when the gradient value is large. Also, to ensure a small image force for a homogeneous neighborhood, the value "5" is used in the denominator when $g_{max}-g_{min}$ is less than the value "5".

Snake Tracking with Motion Estimation

The present invention addresses the motion estimation problem for deformable objects by integrating information from four different sources: motion prediction from previous frames; local motion estimation; global motion estimation; and snake energy minimization.

Global Motion Prediction

The purpose of global motion prediction is to provide a good initial estimate for the subsequent motion estimation algorithms. A first-order prediction is employed. The first-order prediction assumes a constant velocity for each point. Let $d_i(t)$ denote the displacement of point i from time t−1 to t, and $\hat{d}(t+1)$ be the estimate of the displacement from time t to t+1. Initially, $$\hat{d}_i(0)=0$$

For subsequent frames (t>0), $$\hat{d}_i(t)=d_i(t-1),$$

where $d_i(t-1)$ is computed after the end of each motion estimation loop. The preferred embodiment uses the previous three image frames in order to calculate the global motion. More complicated smoothing and prediction algorithms, such as Kalman filtering, may also be used to provide more reliable tracking (see: D. Terzopoulos and R. Szeliski, Tracking With Kalman Snakes, A. Blake and A. Yuille, editors, Active Vision, MIT Press, Cambridge, Mass., 1992).

Local Motion Estimation by Modified Block Matching

In the presence of local deformation, each snake point is analyzed separately for correct tracking. However, as a whole the point motions are to satisfy some (perhaps weak) global constraints. The present invention uses a modified Block Matching Algorithm. The conventional block matching algorithm (BMA) searches within a pre-defined range to find the best match for each block, so that the displaced block difference (in the form of mean square error) is minimized. This approach typically does not work well for tracking the snake points because it does not impose any kind of global constraints on the point motion. In the general motion estimation problem, the motion continuity assumption has been used as a good global constraint. In the contour tracking problem, a neighborhood consistency property is used to improve the BMA.

The BMA is extended to incorporate relaxation labeling for motion estimation of each snake point. Each candidate motion vector within the search range is assigned a probability measure. These probabilities are calculated from the displaced block difference (DBD) of a snake point and its adjacent neighbors, and they are used to find the correct point motion.

Figure 2A:
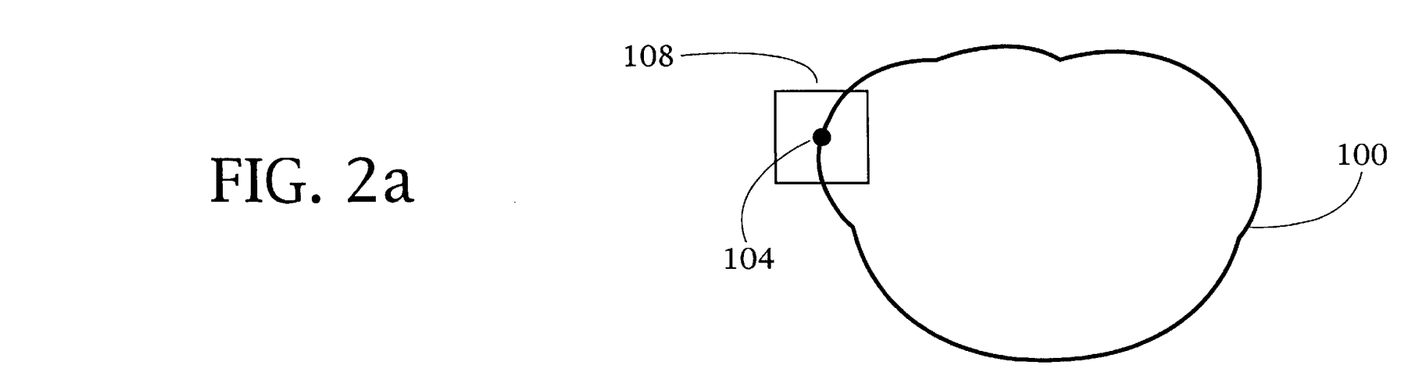
FIGS. 2a–2b illustrate the block matching algorithm with relaxation labeling technique for tracking object images within video frames.
Figure 2B:
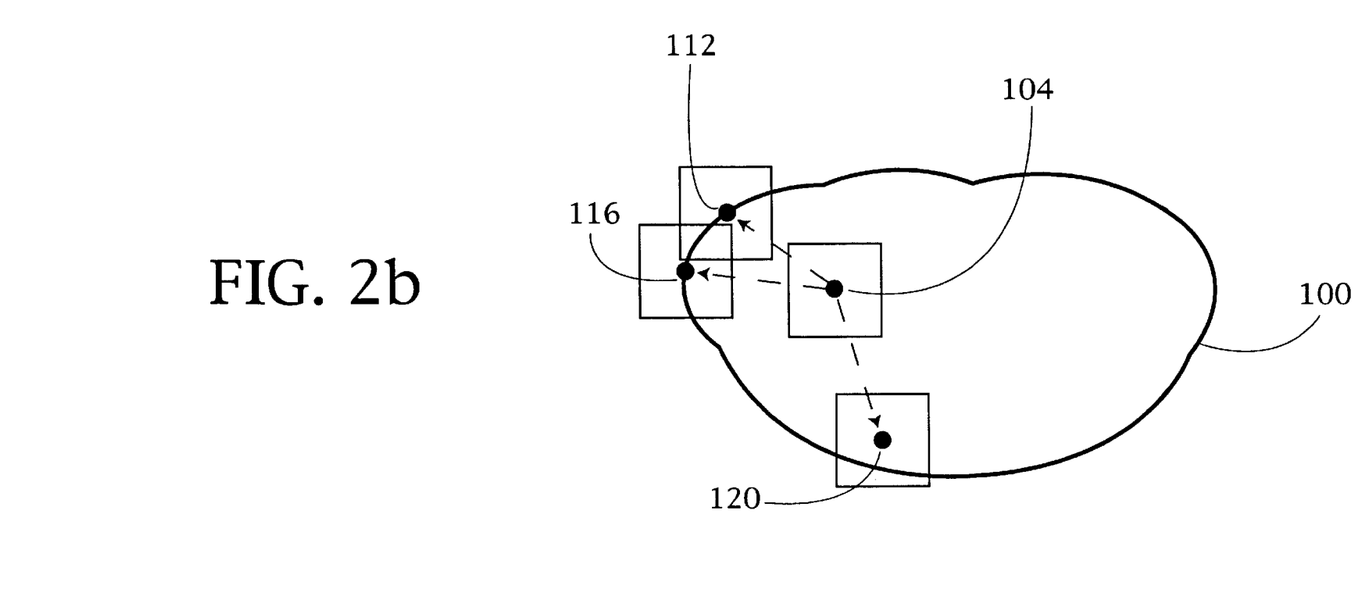

FIGS. 2a–2b illustrate the BMA technique. FIG. 2a shows a current frame which contains an object 100 and a snake point 104. The snake point 104 is used to define a portion of the contour of the object 100. The snake point 104 has a snake feature block 108 associated with it. Within the scope of the present invention, the term snake feature block is synonymous with the term image block.

FIG. 2b shows a frame which is sequentially after the frame of FIG. 2a. The snake point 104 of FIG. 2a is shown on FIG. 2b in order to depict the relationship of snake points between frames. Referring to FIG. 2b, the BMA technique determines the likelihood that snake point 104 has moved to another position on object 100 within the frame of FIG. 2b. The BMA technique determines what blocks on FIG. 2b are approximately similar to the snake feature block of snake point 104. Accordingly, the BMA technique constructs blocks for points with similar features as those of snake point 104, as shown in way of an example, as the blocks associated with points 112, 116, and 120.

Each snake feature block $b_i(t)$ is a 9 by 9 square centered at the snake point $v_i(t)$. In local motion estimation, the goal is to find the best motion vector $\Delta v_i^*(t)=(\Delta x_i^*(t),\Delta y_i^*(t))$ for each snake point in the current frame so that:

$$\hat{v}_i(t+1)=v_i(t)+\hat{d}(t)+\Delta v_i^*(t)$$

is the best initial estimate of the same snake point in the next frame.

In order to find the best motion vector $\Delta v_i^*(t)$ for each snake point $v_i(t)$, an initial probability, $p_i(\Delta v_i)$, is assigned to each possible motion vector $\Delta v_i(t)$. The conditions to be satisfied are:

(1) $\Delta v_i(t) = (\Delta x_i(t), \Delta y_i(t))$ is in the search region $N_i$, which is a square $(\Delta v_i(t) \in N_i = [-p, p] \times [-p, p])$.

(2) $p_i(\Delta v_i)$ is in $[0, 1]$.

(3) $\sum_{\Delta v_i \in N_i} p_i(\Delta v_i) = 1$

These probability estimates are iteratively updated by using the neighborhood consistency property. In other words, if the nearby snake points have a high probability of containing motion vectors similar to $\Delta v_i$, then $p_i(\Delta v_i)$ will gradually increase (reinforced by its neighbors). Otherwise $p_i(\Delta v_i)$ will decrease. At the end of computation, the motion vector with the highest probability is selected as the best motion vector: It is used to find the new position of the snake point and to define the initial contour $$\Delta v_i^*(t) = (\Delta x_i^*(t), \Delta y_i^*(t)) = \arg \max_{\Delta v_i \in N_i} p_i(\Delta v_i).$$

$V(t+1)=[v_1(t+1), v_2(t+1), \ldots, v_n(t+1)]$ for the next frame. The initial probabilities $$p_i^0(\Delta v_i)$$

are based on the DBD (displaced block difference) of the snake block $b_i(t)$ centered on the snake point $v_i(t)$ and the candidate block centered on $v_i(t)+\Delta v_i(t)$ in the next frame. The DBD is denoted by $r_i(\Delta v_i)$ and the "weight" of motion vector $\Delta v_i$ is defined to be:

$$w_i(\Delta v_i) = \frac{1}{1 + c \times r_i(\Delta v_i)}$$

where c is a positive constant. The term $w_i(\Delta v_i)$ is inversely proportional to the DBD $r_i(\Delta v_i)$. Therefore, the larger $r_i(\Delta v_i)$ is, the smaller the weight is. These weights bear a proper qualitative behavior for probability estimates. They range from 0 to 1 and are normalized to yield the initial probability measures:

$$p_i^0(\Delta v_i) = \frac{w_i(\Delta v_i)}{\sum_{\Delta v_i \in N_i} w_i(\Delta v_i)}$$

The initial probabilities depend only on the DBD for each possible motion vector within the search range $N_i$. The notion of neighborhood consistency property is employed by using the probability measures from the neighboring snake points to update the probability measures of motion vectors associated with $v_i(t)$. The two adjacent snake points $v_{i-1}(t)$ and $v_{i+1}(t)$ are considered at this place in the present invention. At the k-th iteration, the probability $p_i^k(\Delta v_i)$ increases if neighboring snake points $v_{i-1}$ and $v_{i+1}$ also have a high probability for a motion vector similar to (but does not have to be the same as) $\Delta v_i$.

Two motion vectors $\Delta_a=(x_a,y_a)$ and $\Delta_b=(x_b,y_b)$ are considered "similar" if $$\|\Delta_a-\Delta_b\|=\max(|x_a-x_b|,|y_a-y_b|) \leq 1$$

For a snake point $v_i$ to update the probability measures of all its motion vectors $\Delta v_i$ in $N_i$, first the current probabilities of all "similar" motion vectors for $v_i$ and its two adjacent neighbors $v_{i-1}$ and $v_{i+1}$ are summed.

$$q_i^k(\Delta v_i) = \sum_{j=i-1}^{i+1} \sum_{\Delta v_{j'}, \|\Delta v_{j'}-\Delta v_j\| \leq 1} p_j^k(\Delta v_{j'})$$

To update $p_i^k(\Delta v_i')$, $$\hat{p}_i^{k+1}(\Delta v_i)=p_i^k(\Delta v_i)\times(k_1+k_2\times q_i^k(\Delta v_i))$$

Here $k_1$ and $k_2$ are two positive constants which control the rate of convergence. Then the probabilities are normalized.

For the preferred embodiment c=10, $k_1$=0.3, $k_2$=3 are used and executed with 10 iterations. At the end of the computation, the $\Delta v_i^*$ with the highest probability is chosen.

$$p_i^{k+1}(\Delta v_i) = \frac{\hat{p}_i^k(\Delta v_i)}{\sum_{\Delta v_i \in N_i} \hat{p}_i^k(\Delta v_i)}$$

For the preferred embodiment, the three candidate motion vectors with the highest motion probabilities are retained and used in the subsequent Affine Transformation Step.

Affine Transformation Motion Correction After the local motion estimation based on block matching, the global motion is calculated by using object contours and image intensity information in two frames. The affine transformation is used to model the global motion. These affine parameters represent information extracted from the whole object and are used to correct the possible errors generated in the block matching process under certain conditions discussed below.

The BMA with relaxation labeling provides a new position of each snake point $v_i(t)$ which results in an estimate of $V(t+1)=[v_1(t+1),v_2(t+1),\ldots,v_n(t+1)]$. The initial estimate of the affine parameters can be calculated from the correspondences between each $v_i(t)=(x_i(t),y_i(t))$ and $v_i(t+1)=(x_i(t+1),y_i(t+1))$ according to:

$$\begin{bmatrix} x_1(t+1) & x_2(t+1) & \cdots & x_n(t+1) \\ y_1(t+1) & y_2(t+1) & \cdots & y_n(t+1) \end{bmatrix} =$$

$$\begin{bmatrix} a_{11} & a_{12} \\ a_{21} & a_{22} \end{bmatrix} \begin{bmatrix} x_1(t) & x_2(t) & \cdots & x_n(t) \\ y_1(t) & y_2(t) & \cdots & y_n(t) \end{bmatrix} + \begin{bmatrix} b_1 \\ b_2 \end{bmatrix} [1 \ 1 \ \cdots \ 1]$$

$$[V(t+1)] = A[V(t)] + B[1 \ 1 \ \cdots \ 1]$$

$$[V(t+1)] = [A \mid B] \begin{bmatrix} [V(t)] \\ [1 \ 1 \ \cdots \ 1] \end{bmatrix}^+$$

The least square solution for $[A|B]$ can be found:

$$[A \mid B] = [V(t+1)] \begin{bmatrix} [V(t)] \\ [1 \ 1 \ \cdots \ 1] \end{bmatrix}^+$$

where $[\ ]^+$ stands for the generalized inverse of a matrix.

However, $v_i(t)$ at time "t" in general may not correspond to the same point represented by $v_i(t+1)$ at time "t+1". After some object motion, the original boundary points may become interior points or disappear altogether due to occlusion. Experimental results show that the "re-appearance" of previous occluded part cause most of the failure of past approaches. Therefore, to improve the quality of the initial estimate, the greatest descent method is applied in the preferred embodiment.

The interior of the contours is used to calculate the error and gradients. The gradients may come from any gradient operator by including the sign (indicating the direction) of the gradient. By assuming that most parts of the object contain a dominant motion which can be approximated by affine transformation, the updated affine parameters can approximately describe the object's motion.

Let O denote the interior area of the object defined by contour V(t). I(x,y,t) and I(x',y',t+1) denote intensity value of pixel (x,y) at time t and pixel (x',y') at time t+1 respectively. (x',y') is the affine transformed position of pixel (x,y). The affine transformed mean square error (MSE) is:

$$MSE = \frac{1}{N(O)} \left( \sum_{(x,y) \in O} (I(x, y, t) - I(x', y', t+1))^2 \right)$$

where N(O) is the total number of pixels in the region O. The $(k+1)^{th}$ iteration of any affine parameter $a_i$ ($a_i$ can be any element from $[a_{11}, a_{12}, a_{21}, a_{22}, b_1, b_2]$) is $$a_i(k+1) = a_i(k) - \lambda \frac{\partial MSE}{\partial a_i} \bigg|_{a_i(k)}$$

where $\lambda$ is the step size in the greatest descent computation.

After the greatest descent computation converges, the best affine parameters are obtained for minimizing image difference. This motion estimation is integrated with the current estimate.

The affine motion correction is applied when the following conditions are satisfied:

(1) The probability of certain motion vectors is too small (i.e., below a predetermined threshold), and
(2) The difference between BMA estimation and affine estimated motion vector is too large (i.e., above a predetermined threshold).

These conditions indicate possible errors in the BMA motion estimation, which can be corrected by including the global motion estimates. An averaging technique is used to combine the two estimates:

$$v_{i,combined}(t) = p_i(t)(v_{i,BMA}(t)) - (1 - p_i(t))v_{i,affine}(t),$$

where $p_i(t)$ is the probability of the BMA motion estimate for point i.

Snake with Motion Estimation

In this step, a fourth term is added to the energy function, which represents the effect of motion and is based on the motion probability: where:

$$E_{snake} = \sum_i E_i$$

$$= \sum_i (\alpha E_{cont}(v_i(t)) + \beta E_{curv}(v_i(t)) + \gamma E_{img}(v_i(t)) + \eta E_{match}(v_i(t)))$$

$$E_{match}(v_i(t)) = -p_i(\Delta v_i(t))$$

$$\Delta v_i(t) = v_i(t) - v_i(t-1)$$

A negative sign before the probability $p_i(\Delta v_i(t))$ is used since a high probability estimate yields a smaller snake energy. Again, $E_{match}$ is normalized to $[-1,0]$.

The motion estimation confidence is incorporated into the snake energy function to restrict the snake to lock on positions with a high probability on motion estimation.

To minimize $E_{snake}$, a "greedy" algorithm is used to iteratively find the minimum (see: A. P. Paplinski and J. F. Boyce, An Implementation Of The Active Contour Method For Noisy Images Using A Local Minimization Algorithm, Technical Report TR-95-1, Department of Robotics and Digital Technology, Monash University, Clayton, Australia, January 1995; and see: D. Williams and M. Shah; A Fast Algorithm For Active Contour, The 3rd IEEE International Conference on Computer Vision, pages 592–595, December. 1990).

For the first frame, $\eta$ is set to zero since motion estimation is not applied yet. After the snake process finds the contour estimate for the first frame, the tracking process starts.

For each snake point $v_i(t)$, $E_{match}$ ($v_i(t)$) is calculated first within a search region of 9×9. Each snake point is moved to the position which has maximum $E_{match}$ as the initial guess of the new contour. Then each snake point searches within a small window (3×3) to stabilize at a new position which gives the minimum energy. After enough iterations when the majority of the snake points stop changing their final location, the estimate of the new contour is obtained. For the preferred embodiment, the search region of 9×9 includes an area of image points (i.e., a square) on the image frame.

Degradation Measure

After the user defines the initial contour, no user input is required for tracking object deformation. However, without the a priori knowledge of object shape, type of deformation, or the location of occlusion, the contour tracking performance typically gradually degrades and eventually becomes unacceptable. The present invention is able to detect such failure, notify the user, and ask for human assistance so that the tracking can be restarted. The present invention uses two types of degradation measures, and both measures can be acquired from the contour tracking computation.

Affine Transformed Error

During the contour tracking, the (global) object motion is calculated by using object contours and image intensity in two frames. In the global motion estimation stage, the best affine parameters are computed for minimizing image difference. These affine parameters are used to warp the interior of the current contour to match the interior of the next contour under certain conditions. The warped matching error is used as one indication of the tracking accuracy. Since the affine parameters have been updated based on the intensity maps, as long as the most of the object preserves rigidity, the affine estimates are representative of the object motion. This matching error may be large due to either one of the following cases:

(1) The object contains a large percentage of deformed area where the affine estimates are not valid.

(2) The contour grows too much by falsely including some background areas to be the interior of the object, or the contour shrinks too much by falsely excluding some object areas to be the exterior of the object.

The first case constitutes false alarms and may consequently result in more frequent requests to the user which ask the user for a new initial contour. The second case, on the other hand, are situations wherein user involvement is actually needed.

Total Snake Energy

The affine warped matching error may misinterpret object deformation to be error. Thus, the total contour energy is used as a second degradation measure to represent the local tracking accuracy. The "rule of thumb" is that the better the tracking is, the lower the total snake energy should be. Therefore, the total snake energy is used to monitor the tracking performance. One advantage of using this measure is that no additional computation is required. Consequently, two complementary degradation measures for automatic performance monitoring are used during the tracking process. The affine transformed error finds the correlation between the object interiors after an affine warping. It is useful when the object conducts a global motion trend describable by affine transformation. The total snake energy, on the other hand, is an indication of how well the local tracking is. Both measures are used to indicate to the user when the tracking begins to degrade beyond tolerance conditions.

Figure 3A:
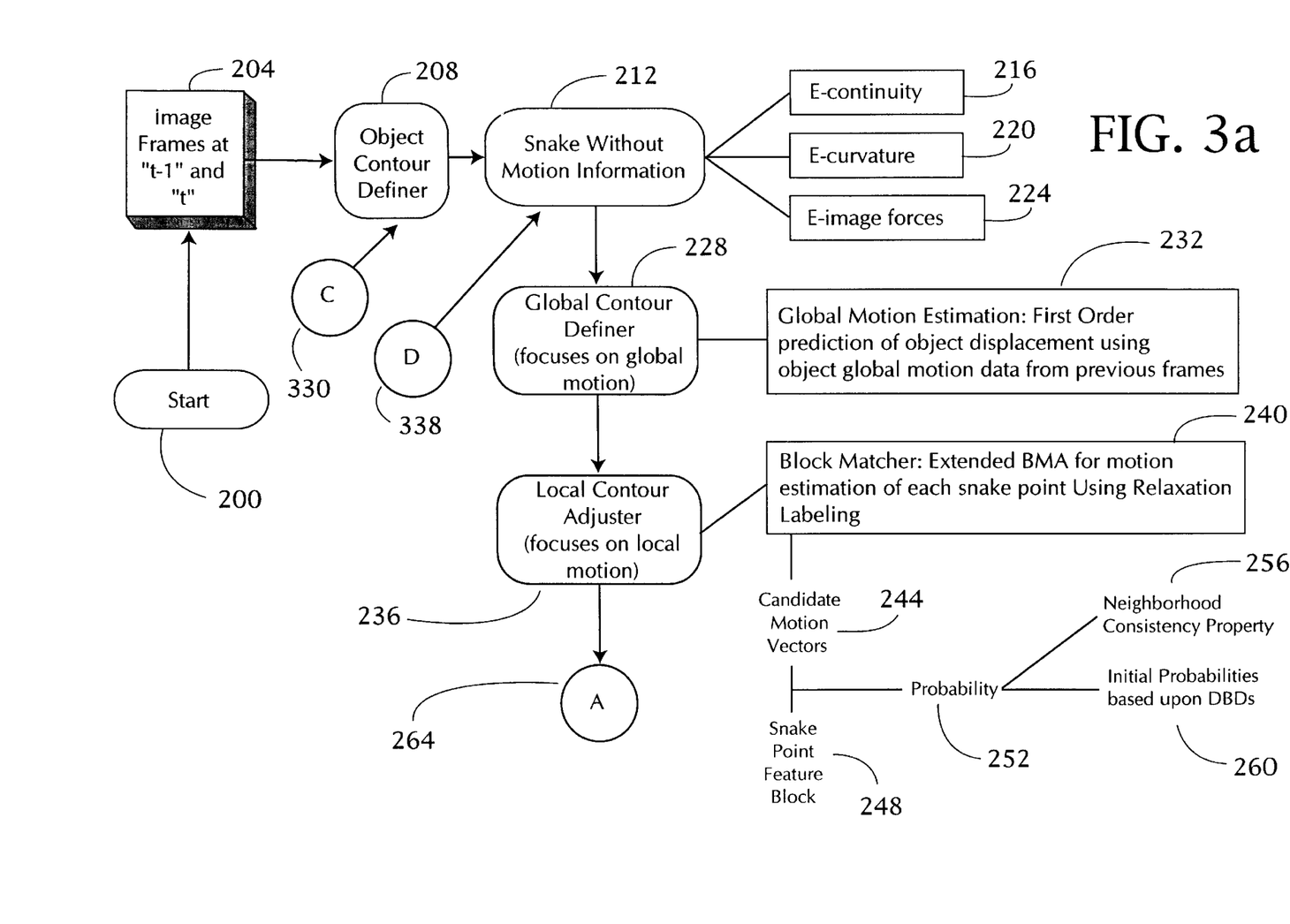
FIGS. 3a–3c are flow charts which depict the steps in tracking an object image within video frames.
Figure 3B:
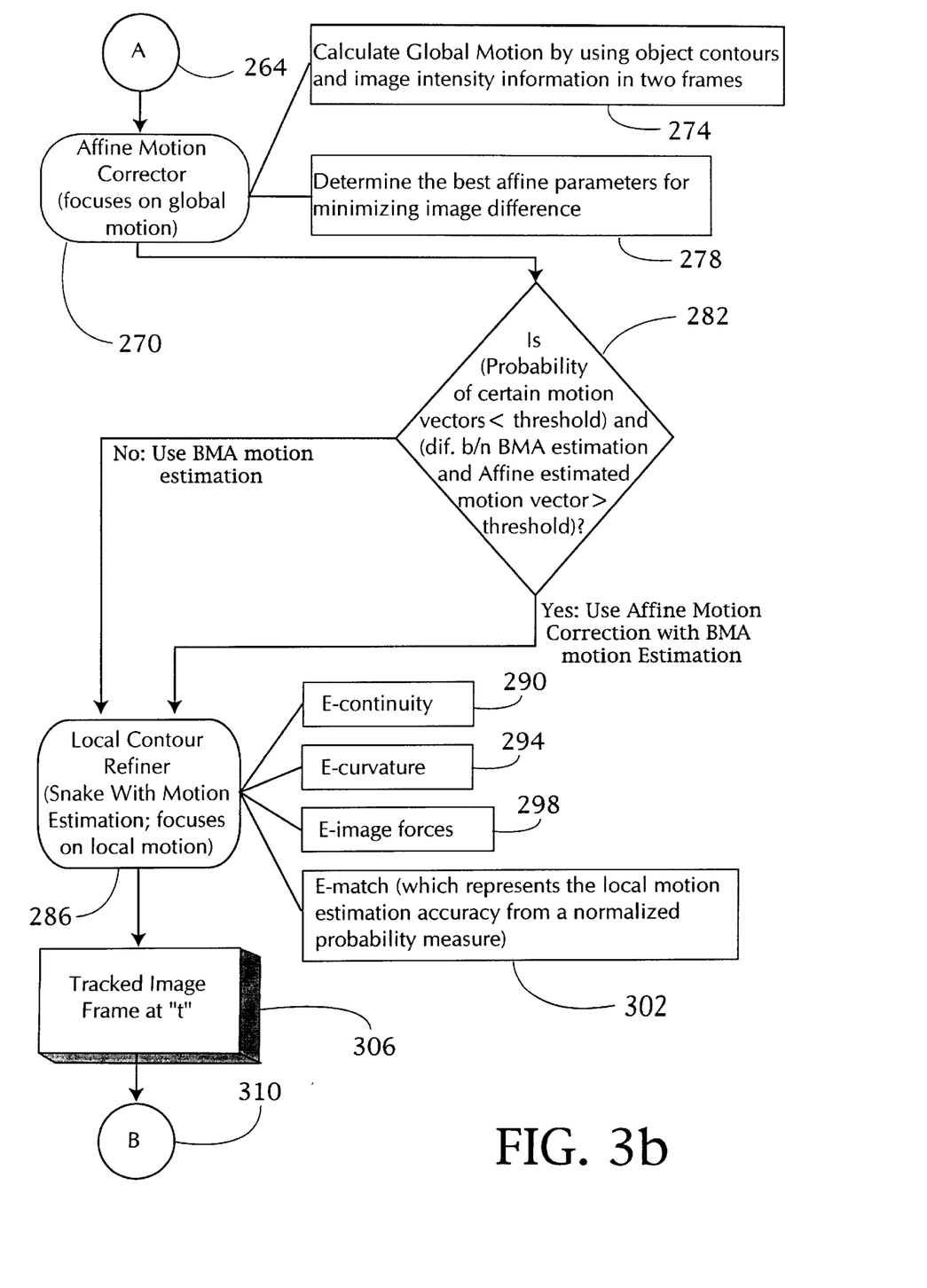
Figure 3C:
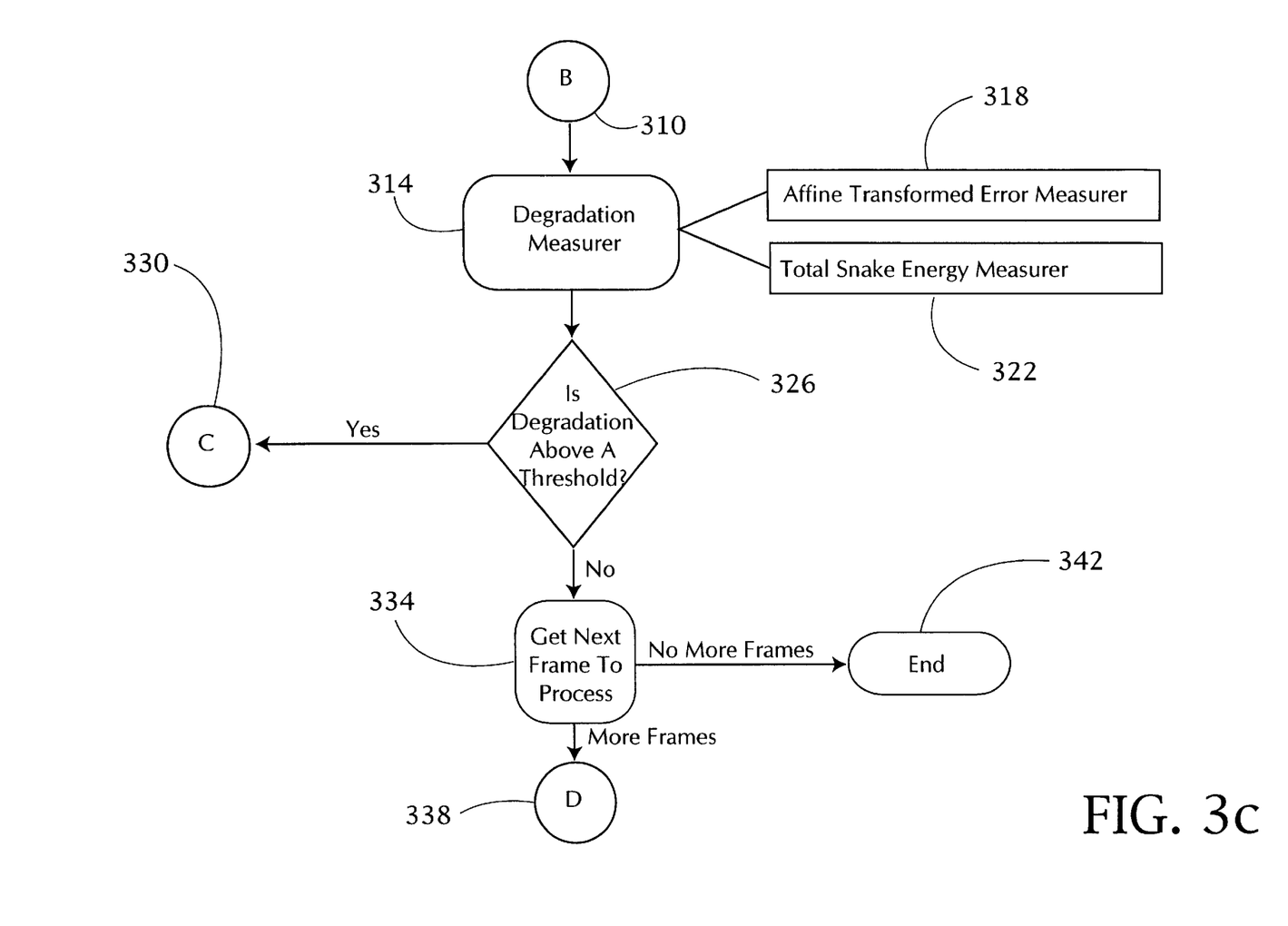

FIGS. 3a–3c are flow charts showing the various steps used by the present invention in order to track objects with the active contour model. The start block 200 indicates that the image frames at "t–1" and "t" at input block 204 are entered into block 208. Block 208 is the object contour definer wherein the contour of the object with an image frame "t–1" is defined with a snake. For the preferred embodiment, the user indicates the contour of the object. However, it is to be understood that the present invention is not limited to only the user defining the contour of the object at this initial step, but includes other techniques for outlining the contour of an object within a frame.

After the contour of the object is defined, block 212 performs a snake calculation upon the contour of the object at "t–1" frame, but without motion information. Block 212 considers the E-continuity factor 216, the E-curvature factor 220, and the E-image forces 224. A global contour definer 228 performs a global motion estimation using a first order prediction of object displacement which is based upon the global motion of the objects from previous frames (as shown at block 232).

The global contour definer 228 provides the initial estimation of the contour for use in the local contour adjuster 236. The local contour adjuster 236 performs block matching with relaxation labeling which focuses on the local motion of the points on the object. For the preferred embodiment, the local contour adjuster 236 uses an extended BMA for motion estimation of each snake point using a relaxation labeler in block matcher 240. Block matcher 240 bases its calculations upon candidate motion vectors 244 which themselves are based upon the snake points within a feature block 248. A probability (at block 252) is calculated with respect to the candidate motion vectors 244 relative to the snake point feature block 248. The probability (at block 252) uses the neighborhood consistency property 256 and has initial probabilities based upon DBDs 260. The top three candidates are retained for use in the affine transformation steps. After the local contour adjuster 236 performs the block matching with relaxation labeling, the processing continues at continuation block A 264.

Referring to FIG. 3b, continuation block A 264 indicates that the affine motion corrector 270 is to be executed. The affine motion corrector 270 performs an affine motion correction which focuses on the global motion of the overall object. The affine motion corrector 270 performs this calculation by using object contours and image intensity information in the two frames as depicted in block 274. Moreover, the affine motion corrector 270 determines the best affine parameters for minimizing the image difference as depicted at block 278.

After the affine motion corrector 270 completes its processing, decision block 282 inquires whether the probability of certain motion vectors are less than a predetermined threshold and whether the difference between the BMA estimation and the affine estimated motion vector is greater than another predetermined threshold. If decision block 282 determines that it is not, then the BMA motion estimation is used by the local motion contour refiner 286. However, if decision block 282 does determine that the conditions are true, then the affine motion correction with BMA motion estimation data is used by the local motion contour refiner 286.

The local motion contour refiner 286 uses the data as provided by decision block 282 in order to perform a snake calculation with motion estimation. The local motion contour refiner 286 focuses upon the local motion of the snake points on the object. The local motion contour refiner 286 uses the following factors in its calculation: E-continuity 290, E-curvature 294, E-image forces 298, and E-match factor 302. The E-match factor 302 represents the local motion estimation accuracy as viewed from a normalized probability measure. The local motion contour refiner 286 produces a tracked image frame at "t" as shown by output block 306. Processing continues at continuation block B 310.

Referring to FIG. 3c, continuation block B 310 indicates that block 314 is to be performed. Block 314 measures the degradation based upon the affine transformed error as determined by the affine transformed error measurer 318 and the total snake energy as determined by the total snake energy measurer 322. Decision block 326 determines whether the degradation as determined by block 314 is above a predetermined threshold. If the degradation is above a predetermined threshold, then processing continues at continuation block C 330 wherein the contour of the object is redefined before processing continues.

If decision block 326 does determine that the degradation is not above a predetermined threshold, then processing continues at block 334. Block 334 attempts to obtain the next frame to process. If there are more frames to process, then processing continues at continuation block D 338. If there are no more frames to process, then processing terminates at block 342.

EXAMPLE

The following example depicts the results of image tracking using the present invention. The example includes a set of image sequences depicting a bird on a lake.

Figure 4A:
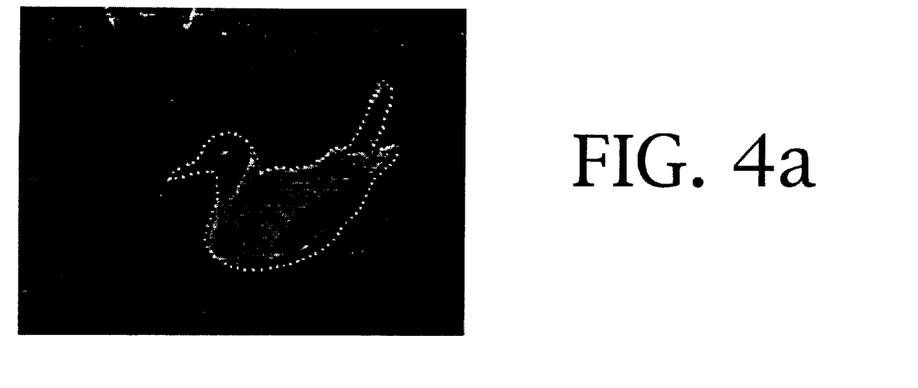
FIGS. 4a–4c are video frames showing the tracking of an object image over three video frames.
Figure 4B:
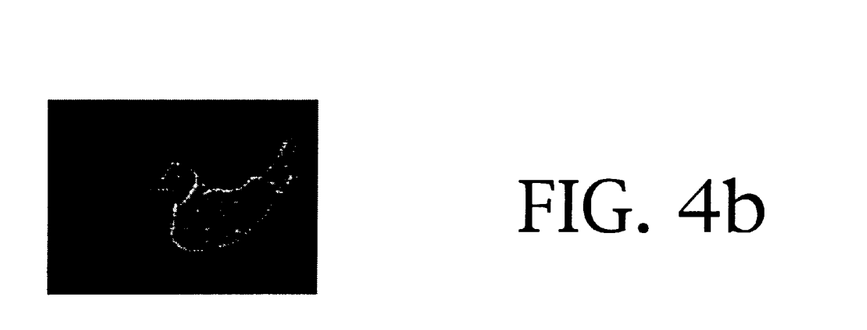
Figure 4C:
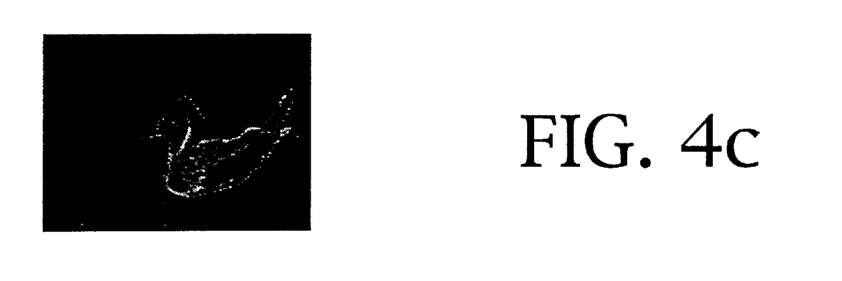
Figure 5A:
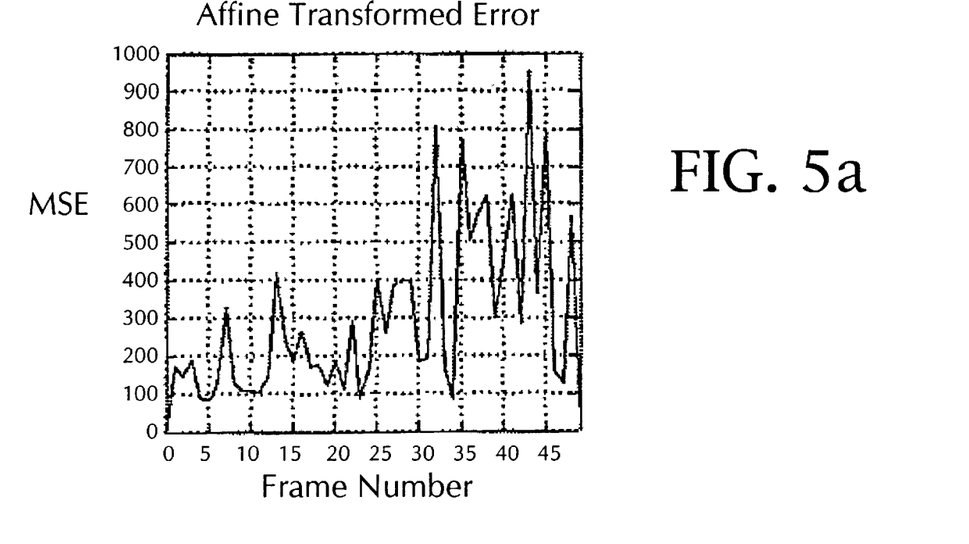
FIG. 5a is a graph depicting the affine transformed error over a number of frames.
Figure 5B:
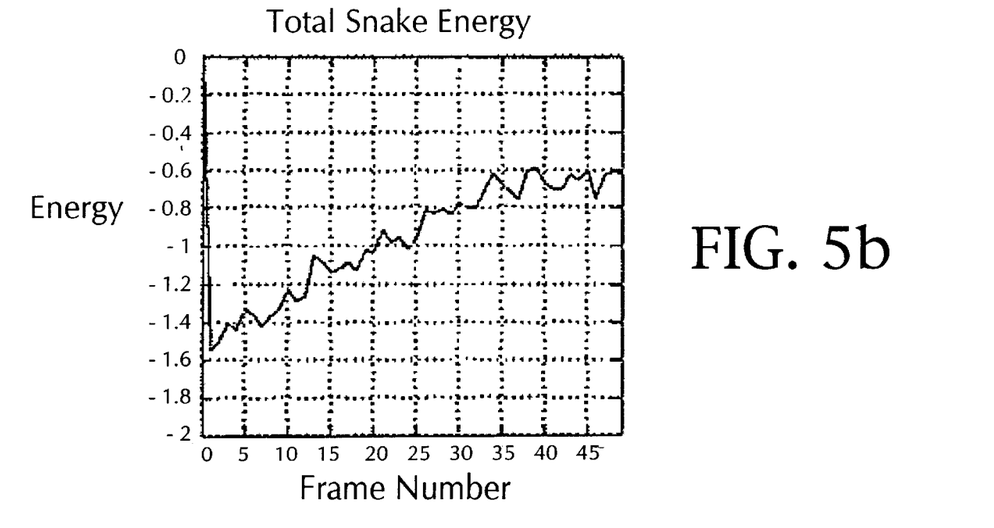
FIG. 5b is a graph depicting the total snake energy over a number of frames.

FIG. 4a shows the user-input initial contour of a bird in a lake. FIG. 4a shows an user-interface object contour definer which is used to define the contour of the image within the frame. FIG. 4b shows the result of tracking the bird with the present invention after four frames of tracking. FIG. 4c shows the result of tracking the bird with the present invention after eight frames of tracking. As the frame number increases, the snake around the object begins to noticeably degrade. From the degradation measures shown in FIG. 5a, it is apparent that when the tracking starts to degrade, the affine transformed error tends to have a local maximum. On the other hand, the error measure may sometimes give a false alarm. Thus, the snake energy is also used. The snake energy has a consistent trend to increase when the tracked number of frames increases as shown in FIG. 5b.

Criteria Used Within The Preferred Embodiment

For the preferred embodiment, the number of iterations for determining when the majority of snake points has stopped changing their final location is 20. For the preferred embodiment, the "majority of the snake points" percentage is 90%.

With respect to whether the affine motion correction is to be applied, the probability value used to indicate that a certain motion vector is too small was 0.3. Also, the probability of certain motion vectors being too small refers to those motion vectors associated with the snake points. With respect to whether the affine motion correction is to be applied, the difference between BMA estimation affine estimated motion vector being too large was the value of 8.

The embodiment which has been set forth above was for the purpose of illustration and was not intended to limit the invention. It will be appreciated by those skilled in the art that various changes and modifications may be made to the embodiment described in this specification without departing from the spirit and scope of the invention as defined by the appended claims.

It is claimed:

1. A computer-implemented method of tracking an image object within successive first and second image frames, said first frame having a first contour model which defines said image object within said first frame, said first contour model having a global motion parameter which defines global motion of the image object between said first frame and at least one frame preceding said first frame, comprising the steps of:

defining a second contour model in said second frame based upon said global motion parameter;

matching image blocks associated with points on said first contour model with image blocks associated with points on said second frame to produce motion probabilities associated with each contour point, said motion probabilities being based upon the amount of displacement between respective matched image blocks of said first and second contour models;

locally adjusting the shape of the second contour model based upon said motion probabilities to produce a locally adjusted second contour model;

determining an energy match term based upon said produced motion probabilities that are associated with each contour point; and refining said locally adjusted second contour model by converging said locally adjusted second contour model toward said image object within said second image frame based upon said energy match term.

2. The method according to claim 1 further comprising the step of:

refining said locally adjusted second contour model by converging said locally adjusted second contour model toward said image object within said second image frame based upon predefined smoothness constraints and upon said motion probabilities.

3. The method according to claim 1 wherein said global motion parameter is based upon the image object displacement between said first frame and at least one frame preceding said first frame.

4. The method according to claim 1 wherein said global motion parameter is based upon the image object displacement between said first frame and a plurality of frames preceding said first frame.

5. The method according to claim 1 further comprising the step of:

storing a predetermined number of matched image blocks for each contour point of said first frame, said stored matched image blocks having motion probabilities which satisfy a predetermined motion probability threshold.

6. The method according to claim 1 wherein said motion probabilities are based upon the amount of displacement between respective matched image blocks of said first and second contour models and upon the degree of similarity of motion from said first frame to said second frame among neighboring points on said second contour model.

7. The method according to claim 6 wherein said degree of similarity of motion is based upon a neighborhood consistency property.

8. The method according to claim 6 wherein said image blocks include blocks of image points centered on points of said first contour model and of said second contour model.

9. The method according to claim 8 wherein each of the image blocks are squares of nine by nine image points.

10. The method according to claim 2 wherein said predefined smoothness constraints include an energy continuity parameter, an energy curvature parameter, an energy image force parameter, and said energy match parameters.

11. The method according to claim 1 further comprising the steps of:

performing an affine transformation based upon the motion probabilities of said matching step to produce affine motion correction terms;

performing the following step if a predetermined correction criteria is satisfied:

adjusting the motion probabilities of said matching step based upon said affine motion correction terms.

12. The method according to claim 11 wherein said predetermined correction criteria is based upon the motion probabilities of said matching step being below a first predetermined threshold.

13. The method according to claim 12 wherein said predetermined correction criteria is based upon a difference being below a second predetermined threshold, said difference being between the motion probabilities of said matching step and the affine motion correction terms.

14. The method according to claim 11 further comprising the step of:

performing the following step if said predetermined correction criteria is satisfied:

refining said locally adjusted second contour model by converging said locally adjusted second contour model toward said image object within said second image frame based upon predefined smoothness constraints and upon said adjusted motion probabilities.

15. The method according to claim 11 further comprising the steps of:

determining an affine transformation error measure based upon said affine motion correction terms;

performing the following step when said determined affine transformation error measure is below a predetermined threshold:

providing a third contour model which defines said image object within said second frame.

16. The method according to claim 15 wherein said third contour model is provided by an user-interface object contour definer.

17. The method according to claim 11 further comprising the steps of:

determining an affine transformation error measure based upon said affine motion correction terms;

determining a total snake energy degradation measure based upon said predefined smoothness constraints and upon said motion probabilities;

performing the following step when said determined affine transformation error measure and said determined total snake energy degradation measure are below a predetermined threshold:

providing a third contour model which defines said image object within said second frame.

18. The method according to claim 17 wherein said third contour model is provided by an user-interface object contour definer.

19. The method according to claim 1 further comprising the steps of:

determining a total snake energy degradation measure based upon said predefined smoothness constraints and upon said motion probabilities;

performing the following step when said determined total snake energy degradation measure is below a predetermined threshold:

providing a third contour model which defines said image object within said second frame.

20. The method according to claim 19 wherein said third contour model is provided by an user-interface object contour definer.

21. The method according to claim 1 wherein said first contour model was defined based upon an energy continuity parameter, an energy curvature parameter, and a energy image force parameter.

22. An apparatus for tracking an image object within successive first and second image frames, said first frame having a first contour model which defines said image object within said first frame, said first contour model having a global motion parameter which defines global motion of the image object between said first frame and at least one frame preceding said first frame, said global motion parameter being used to define a second contour model in said second frame, comprising:

a block matcher for matching image blocks associated with points on said first contour model with image blocks associated with points on said second frame to produce motion probabilities associated with each contour point, said motion probabilities being based upon the amount of displacement between respective matched image blocks of said first and second contour models; and a local contour adjuster for locally adjusting the shape of the second contour model based upon said motion probabilities to produce a locally adjusted second contour model;

an energy match term calculator for determining an energy match term based upon said produced motion probabilities that are associated with each contour point; and a local contour refiner for refining said second contour model by converging said second contour model toward said image object within said second image frame based upon said determined energy match term.

23. The apparatus according to claim 22 further comprising:

a local contour refiner for refining said second contour model by converging said second contour model toward said image object within said second image frame based upon predefined smoothness constraints and upon said motion probabilities.

24. The apparatus according to claim 22 wherein said global motion parameter is based upon the image object displacement between said first frame and at least one frame preceding said first frame.

25. The apparatus according to claim 22 wherein said global motion parameter is based upon the image object displacement between said first frame and a plurality of frames preceding said first frame.

26. The apparatus according to claim 22 wherein said block matcher stores a predetermined number of matched image blocks for each contour point of said first frame, said stored matched image blocks having motion probabilities which satisfy a predetermined motion probability threshold.

27. The apparatus according to claim 22 wherein said motion probabilities are based upon the amount of displacement between respective matched image blocks of said first and second contour models and upon the degree of similarity of motion from said first frame to said second frame among neighboring points on said second contour model.

28. The apparatus according to claim 27 wherein said degree of similarity of motion is based upon a neighborhood consistency property.

29. The apparatus according to claim 27 wherein said image blocks include blocks of image points centered on points of said first contour model and of said second contour model.

30. The apparatus according to claim 29 wherein each of the image blocks are squares of nine by nine image points.

31. The apparatus according to claim 23 wherein said predefined smoothness constraints include an energy continuity parameter, an energy curvature parameter, an energy image force parameter, and said energy match parameter.

32. The apparatus according to claim 22 further comprising:

an affine motion corrector for performing an affine transformation based upon the motion probabilities of said block matching step to produce affine motion correction terms; and wherein said local contour adjuster adjusts the motion probabilities of said matching step based upon said affine motion correction terms if a predetermined correction criteria is satisfied.

33. The apparatus according to claim 32 wherein said predetermined correction criteria is based upon the motion probabilities of said matching step being not within a first predetermined threshold.

34. The apparatus according to claim 33 wherein said predetermined correction criteria is based upon a difference being below a second predetermined threshold, said difference being between the motion probabilities of said matching step and the affine motion correction terms.

35. The apparatus according to claim 32 further comprising:

a local contour refiner for refining said second contour model by converging said second contour model toward said image object within said second image frame based upon predefined smoothness constraints and upon said adjusted motion probabilities when said predetermined correction criteria is satisfied.

36. The apparatus according to claim 32 further comprising:
an affine transformed error measurer for determining an affine transformation error measure based upon said affine motion correction terms; and
an object contour definer for providing a third contour model which defines said image object within said second frame when said determined affine transformation error measure is not within a predetermined threshold.

37. The apparatus according to claim 36 wherein said object contour definer is an user-interface object contour definer.

38. The apparatus according to claim 32 further comprising:
an affine transformed error measurer for determining an affine transformation error measure based upon said affine motion correction terms;
a total snake energy measurer for determining a total snake energy degradation measure based upon said predefined smoothness constraints and upon said motion probabilities; and
an object contour definer for providing a third contour model which defines said image object within said second frame when said determined affine transformation error measure and said determined total snake energy degradation measure are not within a predetermined threshold.

39. The apparatus according to claim 38 wherein said third contour model is provided by an user-interface object contour definer.

40. The apparatus according to claim 33 further comprising the steps of:
a total snake energy measurer for determining a total snake energy degradation measure based upon said predefined smoothness constraints and upon said motion probabilities; and
an object contour definer for providing a third contour model which defines said image object within said second frame when said determined total snake energy degradation measure is not within a predetermined threshold.

41. The apparatus according to claim 40 wherein said third contour model is provided by an user-interface object contour definer.

42. The apparatus according to claim 22 wherein said first contour model was defined based upon an energy continuity parameter, an energy curvature parameter, and a energy image force parameter.

43. The apparatus according to claim 22 further comprising:
a global contour definer for defining said image object with a third contour model in a third image frame based upon a second global motion parameter, said second global motion parameter defining global motion of the image object between said second frame and at least one frame preceding said second frame.

44. A computer-implemented method of tracking an image object within successive first and second image frames, said first frame having a first contour model which defines said image object within said first frame, said first contour model having a global motion parameter which defines global motion of the image object between said first frame and at least one frame preceding said first frame, comprising the steps of:
defining a second contour model in said second frame based upon said global motion parameter;
matching image blocks associated with points on said first contour model with image blocks associated with points on said second frame to produce motion probabilities associated with each contour point, said motion probabilities being based upon the amount of displacement between respective matched image blocks of said first and second contour models;
locally adjusting the shape of the second contour model based upon said motion probabilities to produce a locally adjusted second contour model;
performing an affine transformation based upon the motion probabilities of said matching step to produce affine motion correction terms; and
performing the following step if a predetermined correction criteria is satisfied:
adjusting the motion probabilities of said matching step based upon said affine motion correction terms.

45. The method according to claim 44 wherein said predetermined correction criteria is based upon the motion probabilities of said matching step being below a first predetermined threshold.

46. The method according to claim 45 wherein said predetermined correction criteria is based upon a difference being below a second predetermined threshold, said difference being between the motion probabilities of said matching step and the affine motion correction terms.

47. The method according to claim 44 further comprising the step of:
performing the following step if said predetermined correction criteria is satisfied:
refining said locally adjusted second contour model by converging said locally adjusted second contour model toward said image object within said second image frame based upon predefined smoothness constraints and upon said adjusted motion probabilities.

48. The method according to claim 44 further comprising the steps of:
determining an affine transformation error measure based upon said affine motion correction terms;
performing the following step when said determined affine transformation error measure is below a predetermined threshold:
providing a third contour model which defines said image object within said second frame.

49. The method according to claim 48 wherein said third contour model is provided by an user-interface object contour definer.

50. The method according to claim 44 further comprising the steps of:
determining an affine transformation error measure based upon said affine motion correction terms;
determining a total snake energy degradation measure based upon said predefined smoothness constraints and upon said motion probabilities;
performing the following step when said determined affine transformation error measure and said determined total snake energy degradation measure are below a predetermined threshold:
providing a third contour model which defines said image object within said second frame.

51. The method according to claim 50 wherein said third contour model is provided by an user-interface object contour definer.

52. The method according to claim 44 further comprising the step of:

refining said locally adjusted second contour model by converging said locally adjusted second contour model toward said image object within said second image frame based upon predefined smoothness constraints and upon said motion probabilities.

53. The method according to claim 44 wherein said global motion parameter is based upon the image object displacement between said first frame and at least one frame preceding said first frame.

54. The method according to claim 44 wherein said global motion parameter is based upon the image object displacement between said first frame and a plurality of frames preceding said first frame.

55. The method according to claim 44 further comprising the step of:

storing a predetermined number of matched image blocks for each contour point of said first frame, said stored matched image blocks having motion probabilities which satisfy a predetermined motion probability threshold.

56. The method according to claim 44 wherein said motion probabilities are based upon the amount of displacement between respective matched image blocks of said first and second contour models and upon the degree of similarity of motion from said first frame to said second frame among neighboring points on said second contour model.

57. The method according to claim 56 wherein said degree of similarity of motion is based upon a neighborhood consistency property.

58. The method according to claim 56 wherein said image blocks include blocks of image points centered on points of said first contour model and of said second contour model.

59. The method according to claim 58 wherein each of the image blocks are squares of nine by nine image points.

60. The method according to claim 52 wherein said predefined smoothness constraints include an energy continuity parameter, an energy curvature parameter, an energy image force parameter, and an energy match parameter; and wherein said energy match parameter is based upon said motion probabilities.

* * * * *